United States Patent [19]
Randmere et al.

[11] 3,933,233
[45] Jan. 20, 1976

[54] CONTROL CIRCUIT FOR SUBSCRIBER STATION IN VIDEO TELEPHONE SYSTEM

[75] Inventors: Uno Randmere, Victor; Walter A. Halbig, Webster, both of N.Y.

[73] Assignee: Stromberg-Carlson Corporation, Rochester, N.Y.

[22] Filed: Jan. 2, 1974

[21] Appl. No.: 429,936

[52] U.S. Cl. .............................................. 179/2 TV
[51] Int. Cl.² ...................................... H04M 11/06
[58] Field of Search .......................... 179/2 TV, 99

[56] References Cited
UNITED STATES PATENTS

| | | | |
|---|---|---|---|
| 3,612,767 | 10/1971 | Anderson et al. ................. | 179/2 TV |
| 3,649,761 | 3/1972 | Bush et al. .......................... | 179/2 TV |
| 3,684,833 | 8/1972 | Bush et al. ............................ | 179/99 |
| 3,711,648 | 1/1973 | Whitney ............................ | 179/2 TV |
| 3,723,654 | 3/1973 | Bunce et al. ....................... | 179/2 TV |

Primary Examiner—Kathleen H. Claffy
Assistant Examiner—George G. Stellar
Attorney, Agent, or Firm—Hoffman Stone; William F. Porter, Jr.

[57] ABSTRACT

A control circuit for a subscriber station in a video telephone system includes detectors, gates, and toggles responsive to the various local and incoming supervisory signals to control operation of the local audio and video receivers and transmitters, and the ringers for selectively announcing incoming ordinary and video calls.

5 Claims, 1 Drawing Figure

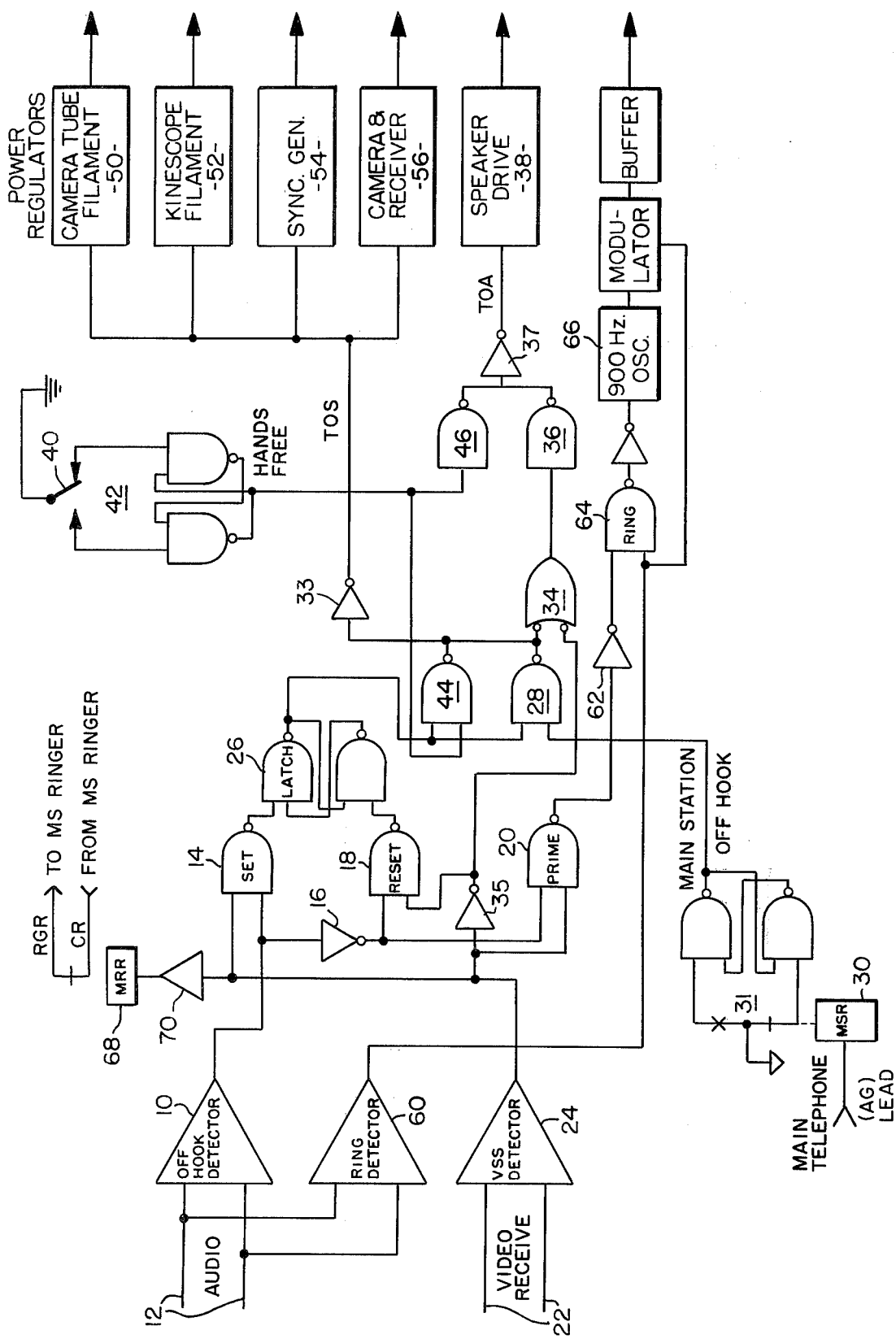

CONTROL CIRCUIT FOR SUBSCRIBER STATION IN VIDEO TELEPHONE SYSTEM

BRIEF DESCRIPTION

This invention relates to a novel circuit for controlling the operation of a subscriber station in a video telephone system.

Standards for supervisory signalling in video telephone systems have been established in the industry to enable satisfactory interconnection among the various different operating companies. See The Bell System Technical Journal, Vol. 50, No. 2, for February 1971, page 305, et. seq. The circuit of the present invention is designed to meet the established standards as described in that reference.

The circuit includes so-called high threshold logic, electrical toggles, and power regulators to energize the local tone ringer, transmitter, and video gear at the proper times, and to prevent energization of the video display and camera at times when they should not be energized.

Three detectors are used, one to sense an off-hook condition at the subscriber's station, one to detect the conventional 20 Hertz ring signal, and one to detect the video supervisory signal received on the video leads from the central office whenever a video call is in progress. The detectors produce signals that are gated to control energization of the various operating components of the subscriber's system including the video camera and receiver, the synchronizing generator, the power regulator for the loudspeaker, and the oscillator used to produce a special tone to announce an incoming video call. The arrangement also distinguishes between calls placed from the subscriber's master set and those placed from extensions that are not equipped for video calls, so that the video gear is not switched on for calls made from an extension.

DETAILED DESCRIPTION

A presently preferred embodiment of the invention will now be described in conjunction with the accompanying drawing, wherein the single FIGURE is a schematic diagram in block form of a control circuit according to the invention.

As shown, an OFF-HOOK detector 10 is connected across the audio leads 12 to produce an output signal whenever one of the subscriber's local sets goes off hook or the so-called "hands free" operation is used. The output signal of the detector 10 is applied to one input of a SET gate 14, partially to enable it. It is also applied through an invertor 16 to a RESET gate 18 and a PRIME gate 20, inhibiting them. Thus, when the local station goes off hook the SET gate 14 is partially enabled, and the PRIME and RESET gates are inhibited. If hands free operation has been selected, a logic signal is applied to a gate 46, and through it and an invertor 37 to the speaker drive control 38 to turn on the speaker drive power so that dial tones on the audio leads 12 may be heard.

Nothing further occurs in the control circuit until the central office effects a connection from the local station to another station also equipped for receiving video calls. When the connection is made, the central office sends a video supervisory signal on the video receive leads 22 to both the calling and called parties. The video supervisory signal is detected by the VSS detector 24, the output of which is connected to the SET and PRIME gates 14 and 20, respectively, fully to enable the SET gate 14 of the calling party. The output of the VSS detector 24 is also applied, through an invertor 35, to the RESET gate 18, further inhibiting it, and to gate 34. The gate 34 operates as an OR gate, and can be enabled by either the VSS detector 24 or the "turn on set" (TOS) signals at the gates 28 and 44. The output of the SET gate 14 then changes to trigger a LATCH toggle 26. The output of the LATCH toggle 26 is applied to one input of each of a pair of gates 28 and 44, which, together with the gates 46 and 36 and an invertor 37 constitute the "turn on audio" (TOA) logic. When a signal from either the OFF HOOK toggle 31, which is responsive to the hook switch at the subscriber's main station, or the HANDS FREE toggle 42, which is responsive to the hands free switch 40, is present while a LATCH condition exists, the output of the gates 28 and 44 changes state. This change, through the invertor 33, turns on the power regulators 50, 52, 54, and 56 for the video components of the system. Also, the output of the gates 28 and 44 enables the gate 34 to keep the speaker drive power 38 on regardless of the state of the VSS detector 24.

For an incoming call, as soon as the central office completes the connection to the local station, it applies a video supervisory signal on the video receive leads 22. The signal is detected by the VSS detector 24, which applies its output through the invertor 35 and the OR gate 34 and the gate 36 to turn on the power regulator 38 for the loudspeaker. When the 20 Hz. ring signal is applied by the central office across the audio pair 12, it is sensed by the ring detector 60, which produces a 20 Hz. square wave at its output. This signal is used in conjunction with the output of the VSS detector 24 to apply a special "video call" signal to the loudspeaker of the set. In the absence of an off hook condition, the output of the OFF HOOK detector 10, through the invertor 16 partially enables the PRIME gate 20, and during this time a change in the output of the VSS detector 24 in response to a video supervisory signal on the video receive leads 22 enables the PRIME gate 20, causing its output condition to change. The output of the PRIME gate 20 is fed through an invertor 62 to one input of the RING gate 64, and the output of the RING detector 60 is fed to the second input of the RING gate 64. When the ring signal occurs simultaneously with the video supervisory signal, and in the absence of an off hook condition, the "video call" signal is generated.

In the circuit as shown, the "video call" signal is generated by an oscillator 66 set at about 900 Hz., and, in accordance with the invention, its output is modulated by the 20 Hz. square wave signal from the RING detector 60. The modulated 900 Hz. signal is applied to the loudspeaker to cause it to emit a distinctive tone indicating that an incoming video call awaits response. The regular ringers in the subsets ring in the regular way in response to the 20 Hz. ring signal from the central office.

The output of the VSS detector 24 also drives an MRR relay driver 68 through a buffer 70 to open the normal ringer lead RGR in the main station set.

When the local station goes off hook in response to the incoming call signal, the PRIME gate 20 is inhibited by the change in the output of the OFF HOOK detector 10, discontinuing the generation of the "video call" signal. The ring-trip relay at the central station cuts off the 20 Hz. ring signal at the same time. Also, when the station goes off hook the circuit operates as in an originating call, to turn on the video gear through the LATCH toggle 26.

At the end of a call, when one party goes on hook the LATCH toggle 26 at his station will remain set until the video supervisory signal is removed from the video receive leads 22 by the central office. When that happens, the set returns to its standby condition awaiting the initiation of a new call.

Power for operating the control circuit may be provided as desired, most conveniently by rectified power supplies kept constantly energized from the subscriber's conventional house wiring.

What is claimed is:

1. A control circuit for a subscriber station in a video telephone system of the kind in which the station includes separate audio and video receive leads, a loudspeaker and means for driving it, an annunciator system for alerting the subscriber to incoming video calls, and video gear including a video camera, a video display device, and means for producing synchronizing signals, said circuit comprising:
   a. an OFF HOOK detector for producing an output signal in response to an off-hook signal on the audio leads of the station,
   b. a RING detector for producing an output signal in response to a ring signal on the audio leads,
   c. a VIDEO detector for producing an output signal in response to a video supervisory signal on the video receive leads of the station, and
   d. means including electrical toggles, gates, and invertors responsive to the output signals produced by said OFF HOOK, RING, and VIDEO detectors for selectively energizing and deenergizing the video gear, the loudspeaker, and the annunciator system of the subscriber station, turning the video gear on in response to simultaneous output signals from the OFF HOOK and the VIDEO detectors and holding it deenergized in the absence of either, and energizing the loudspeaker drive means in response to an output signal from the VIDEO detector in the absence of an output signal from the OFF HOOK detector.

2. A control circuit according to claim 1 including a SET gate having two inputs connected respectively to the outputs of said OFF HOOK and said VIDEO detectors to produce a SET signal whenever said OFF HOOK and said VIDEO detectors produce output signals simultaneously, and turn on means responsive to a SET signal produced by said SET gate to turn on the video gear of the subscriber station whenever an off hook condition exists at the master set of the station at the same time that a video supervisory signal is present.

3. A control circuit for a subscriber station in a video telephone system of the kind in which the station includes separate audio and video receive leads, a loudspeaker and means for driving it, an annunciator system for alerting the subscriber to incoming video calls, and video gear including a video camera, a video display device, and means for producing synchronizing signals, said circuit comprising:
   a. an OFF HOOK detector for producing an output signal in response to an off-hook signal on the audio leads of the station,
   b. a RING detector for producing an output signal in response to a ring signal on the audio leads,
   c. a VIDEO detector for producing an output signal in response to a video supervisory signal on the video receive leads of the station, and
   d. means including electrical toggles, gates, and invertors responsive to the output signals produced by said OFF HOOK, RING, and VIDEO detectors for selectively energizing and deenergizing the video gear, the loudspeaker, and the annunciator system of the subscriber station, turning the video gear on in response to simultaneous output signals from the OFF HOOK and the VIDEO detectors and holding it deenergized in the absence of either, and energizing the loudspeaker drive means in response to an output signal from the VIDEO detector in the absence of an output signal from the OFF HOOK detector,
   e. said energizing and deenergizing means including a toggle, means for setting said toggle in response to the simultaneous occurrence of an off hook condition and a video supervisory signal, means for resetting said toggle in response to the simultaneous absence of an off hook condition and a video supervisory signal, and turn on means responsive to the output of said toggle for turning on the video gear during times when said toggle is set and holding it off when said toggle is in its re-set condition.

4. A control circuit according to claim 3 wherein the annunciator system includes an oscillator for producing an electrical signal at a frequency of about 900 Hertz, a modulator for modulating the signal produced by said oscillator, means for producing a square wave signal responsively to a ring signal when one is present on the audio leads, the square wave signal being at the same repetition rate as the ring signal, means for applying the square wave signal so produced to said modulator to modulate the output signal of said oscillator, and means for applying the modulated signal from said modulator to drive the loudspeaker, thereby to produce a distinctive tone to announce an incoming call.

5. A control circuit according to claim 3 including also a manually operatable switch, and a toggle responsive to said switch for energizing the loudspeaker drive means independently of the conditions in other parts of the circuit.

* * * * *